June 17, 1924.
G. W. FORRESTER
BEARING LUBRICATOR
Filed Jan. 21, 1920
1,497,900
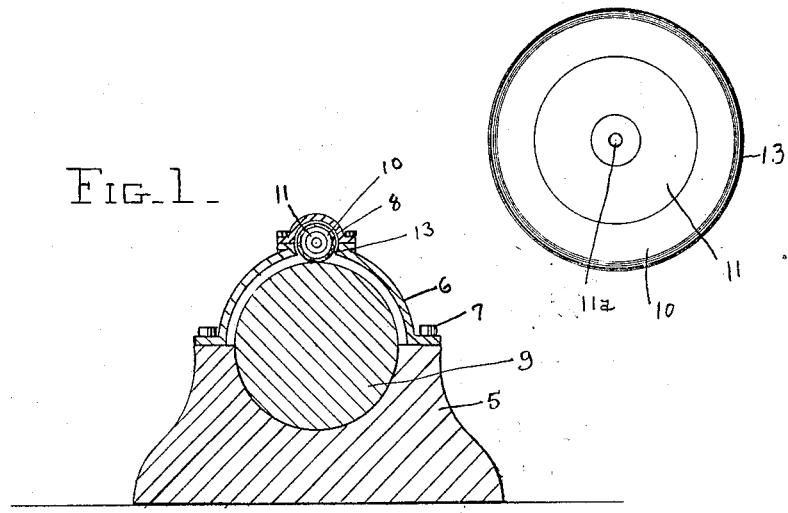
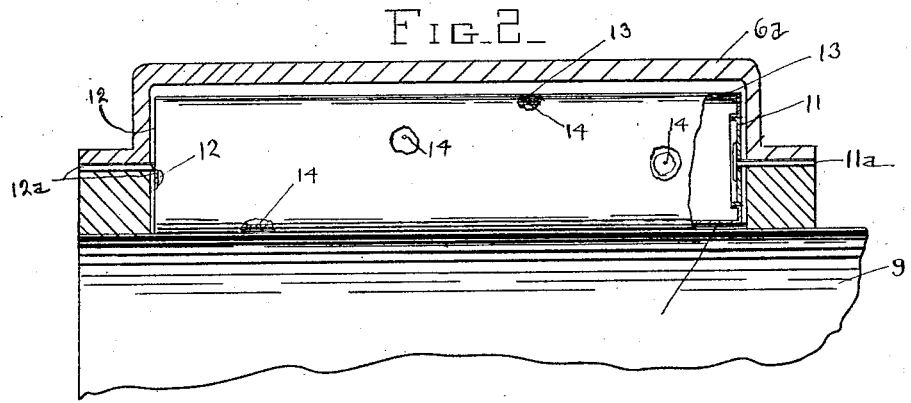
INVENTOR
Geo W Forrester
By Joseph J. O'Brien
ATTORNEY Patented June 17, 1924.

1,497,900

UNITED STATES PATENT OFFICE.

GEORGE WYLIE FORRESTER, OF HOLYOKE, MASSACHUSETTS.

BEARING LUBRICATOR.

Application filed January 21, 1920. Serial No. 353,115.

*To all whom it may concern:*

Be it known that GEORGE W. FORRESTER, citizen of the United States of America, residing at Holyoke, in the county of Hampden and State of Massachusetts, has invented certain new and useful Improvements in Bearing Lubricators, of which the following is a specification.

This invention relates to improvements in means for lubricating journals and bearings and particularly in the provision of a lubricator adapted to contain within itself a relatively large reserve supply of lubricating oil and provided with means for distributing this oil to the working parts of the bearing so as to maintain an evenly distributed film of oil of uniform depth on the working surfaces.

The invention is embodied in a construction which includes a roller in the form of a receptacle or reservoir having one or more restricted outlets through which the oil may escape and a covering of felt or absorbent material enclosing the same and arranged to distribute the oil directly to the working parts.

With the above and other objects in view this invention relates to certain new and useful constructions, combinations and arrangements of parts, clearly described in the following specification and fully illustrated in the accompanying drawings, in which:

Figure 1 is a vertical sectional view through a bearing or journal equipped with my improved lubricator.

Figure 2 is a longitudinal sectional view thereof.

Figure 3 is a side elevation of the reservoir or receptacle.

Referring to the accompanying drawings 5 designates the base of a bearing or journal and 6 the top thereof, which is secured thereto by means of bolts or the like 7.

The top 6 is preferably formed with a longitudinally extending chamber 8 in which my improved lubricator is mounted so as to have contacting rolling engagement with the rotating element or shaft 9 which extends through the bearing or journal.

My improved lubricator includes a cylindrical container 10 equipped with detachable end walls or caps 11 and 12 threaded thereon. The cap 11 is equipped with a stub shaft 11ª fixed thereon and the cap 12 is equipped with a stub shaft 12ª fixed thereon, which together provide trunnions for the container 10.

An absorbent jacket 13 is placed around the receptacle 10 and is preferably wrapped spirally thereon so as to provide a plurality of contacting layers. The wall of the cylinder 10 is preferably formed with one or more restricted oil openings or outlets 14 arranged in a spiral on the cylinder so that said openings will be successively brought directly under the axis of the container to permit of gravity flow therethrough, and thus insure uniform distribution of lubricating oil throughout the absorbent jacket 13.

By means of my invention a journal or bearing can be supplied with oil for any predetermined period when the consumption of oil by the bearing or journal has been previously ascertained. When the lubricator is rotated by the action of the element 9 oil will be distributed over the same in a most satisfactory manner.

Severe tests of the improved lubricator establish the fact that it maintains a thin film of oil of uniform depth and evenly distributed over the working surfaces, which insures of maximum lubrication efficiency, resulting in reduced oil consumption, diminished load resistance to the operating motive power, and elimination of interruptions and break downs, resulting from imperfect lubrication, thus effecting important economies in production.

When the reservoir or receptacle 10 is empty it can be readily recharged by removing either of the caps 11 or 12 and pouring the oil into the container.

The rotation of the container and absorbent jacket presents a constantly changing surface to the working part, which effects a better transference of heat from the metal to the felt, a cooling of the felt or absorbent material, and the prevention of its hardening, burning or carbonization due to long contact at one point with the friction heated metal. The result of this is that the efficiency of the felt is maintained over long periods and lubrication maintained so long as oil is present.

Having described my invention, I claim:

1. The combination, a bearing having a cover and a chamber thereunder, said cover having a detachable plate, a hollow cylinder provided with stub shafts journaled between said cover and said plate, said cylinder having one or more openings therein, said openings being located in a spiral, and a jacket of absorbent material spirally wound on said cylinder, said jacket being adapted to maintain frictional rolling contact with the shaft working in said bearing.

2. A lubricator consisting of a hollow cylinder having one end wall provided with a stub shaft and its other end wall provided with an annular member having an inturned flange, a cap detachably secured in said inturned flange and provided with a stub shaft, said cylinder having openings spirally arranged thereon and relatively few in number, said openings being exceedingly small in area and the major portion of said wall being free of said openings, and an absorbent jacket spirally wound on said cylinder to receive oil exuded through said openings.

Signed at Holyoke, Mass.

GEORGE WYLIE FORRESTER.